UNITED STATES PATENT OFFICE.

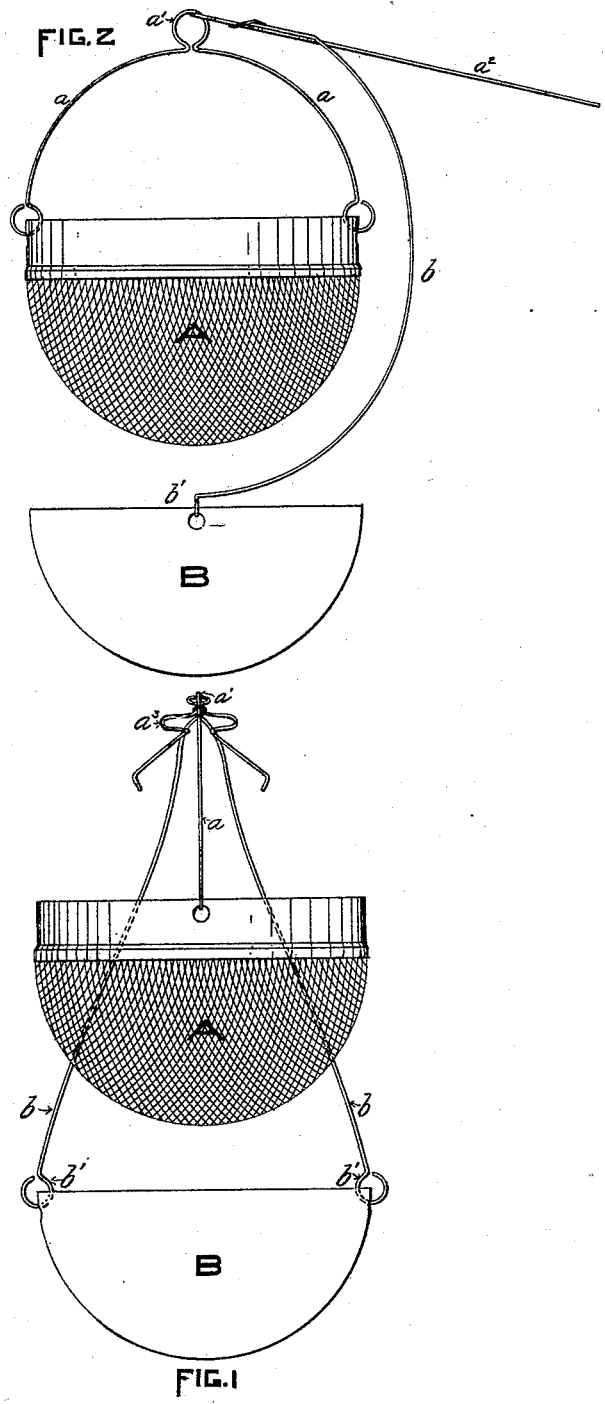

NATHAN F. WHIPPLE, OF PAWTUCKET, RHODE ISLAND, ASSIGNOR OF ONE-HALF TO J. EDWIN JUDSON, OF NEW HAVEN, CONNECTICUT.

COFFEE OR TEA STRAINER.

SPECIFICATION forming part of Letters Patent No. 421,460, dated February 18, 1890.

Application filed August 16, 1889. Serial No. 321,027. (No model.)

*To all whom it may concern:*

Be it known that I, NATHAN F. WHIPPLE, a citizen of the United States, residing at Pawtucket, in the county of Providence and State of Rhode Island, have invented certain new and useful Improvements in Coffee or Tea Strainers; and I do hereby declare that the following is a full, clear, and exact description of the invention, which will enable others skilled in the art to which it appertains to make and use the same.

The object of my invention is to provide a drip-cup to be used in connection with a tea or coffee strainer, which will catch any drops falling from the strainer, and I accomplish this by the means illustrated in the accompanying drawings, in which—

Figure 1 is a front plan view of cup and strainer, and Fig. 2 a side plan view.

In Fig. 2, A designates a strainer, such as commonly employed, attached to tea or coffee pots, having a bail $a$ loosely secured to opposite points of the rim thereof, said bail having a ring $a'$ swiveled to the arm $a^2$, which terminates in a modified U-spring, (designated $a^3$, Fig. 1,) said spring holding the arm $a^2$ firmly in the spout of the coffee-pot.

B designates a metal cup, loosely secured to arms $b\ b$ by the swivel-rings $b'\ b'$ at opposite points of the rim thereof. The arms $b\ b$ are preferably curved around the strainer and the ends thereof bent around the arm $a^2$ and firmly secured.

It will readily be seen that the cup B rests directly beneath the strainer in the position indicated in the drawings when the coffee or tea pot rests on the table. When the pot is tilted, the strainer, being swiveled to the arm $a^2$, will swing into a position beneath the spout of the pot and the contents of the pot pass through said strainer. The cup B, however, being firmly secured to the arm $a^2$, will retain its relative position to the pot and permit the contents to pass through the strainer into the receptacle, and being loosely secured to the arms $b\ b$ will retain a horizontal position at any angle. When the pot resumes its normal position, the cup again resumes its place beneath the strainer and catches any drip falling from the same. The advantages of such an arrangement are apparent to all housekeepers and need not be referred to here.

I claim—

1. In coffee or tea strainers, the strainer A and a cup suspended from an arm or arms, mounted in the spout of a pot for holding coffee or other substances, substantially as set forth.

2. The combination of a cup B, swiveled to the arms $b\ b$, firmly secured to the arm $a^2$, mounted and secured by the U-shaped spring in the spout of a pot, and the strainer A, loosely suspended from said arm $a^2$, substantially as described.

In testimony whereof I have hereunto set my hand in the presence of subscribing witnesses.

NATHAN F. WHIPPLE.

In presence of—
EDW. W. BLODGETT,
J. EDWIN JUDSON.